(12) United States Patent  
Taniguchi et al.

(10) Patent No.: US 8,079,061 B2  
(45) Date of Patent: Dec. 13, 2011

(54) AUTHENTICATION SYSTEM MANAGING METHOD

(75) Inventors: Kazuhiko Taniguchi, Yokohama (JP); Yoshiaki Isobe, Yokohama (JP); Nariyasu Hamada, Inagi (JP); Hiroyuki Shimizu, Kiyose (JP)

(73) Assignee: Hitachi, Ltd., Tokyo (JP)

( * ) Notice: Subject to any disclaimer, the term of this patent is extended or adjusted under 35 U.S.C. 154(b) by 948 days.

(21) Appl. No.: 11/949,159

(22) Filed: Dec. 3, 2007

(65) Prior Publication Data

US 2008/0178262 A1 Jul. 24, 2008

(30) Foreign Application Priority Data

Dec. 4, 2006 (JP) .................................. 2006-326443

(51) Int. Cl.  
*G06F 7/04* (2006.01)  
*G06F 17/30* (2006.01)

(52) U.S. Cl. .......................................... 726/2; 713/186

(58) Field of Classification Search ......... 726/2; 713/186  
See application file for complete search history.

(56) References Cited

U.S. PATENT DOCUMENTS

| | | | |
|---|---|---|---|
| 6,751,733 B1 * | 6/2004 | Nakamura et al. ............. 713/182 |
| 6,813,010 B2 * | 11/2004 | Kono et al. ..................... 356/71 |
| 2002/0133725 A1 * | 9/2002 | Roy et al. ....................... 713/202 |
| 2004/0120556 A1 * | 6/2004 | Kono et al. ..................... 382/124 |
| 2005/0185827 A1 * | 8/2005 | Kono et al. ..................... 382/124 |
| 2005/0273866 A1 * | 12/2005 | Brown et al. .................... 726/28 |
| 2006/0115129 A1 * | 6/2006 | Abe ................................ 382/115 |
| 2006/0174135 A1 * | 8/2006 | Takaku et al. .................. 713/186 |
| 2006/0293892 A1 * | 12/2006 | Pathuel .......................... 704/246 |
| 2007/0050634 A1 * | 3/2007 | Makimoto et al. ............ 713/182 |
| 2007/0057763 A1 * | 3/2007 | Blattner et al. ................ 340/5.52 |
| 2007/0160198 A1 * | 7/2007 | Orsini et al. .................... 380/28 |
| 2007/0175986 A1 * | 8/2007 | Petrone et al. ................. 235/382 |
| 2008/0046753 A1 * | 2/2008 | Fusari ............................. 713/186 |
| 2008/0049988 A1 * | 2/2008 | Basile et al. ................... 382/124 |
| 2008/0072283 A1 * | 3/2008 | Relyea et al. .................. 726/2 |

FOREIGN PATENT DOCUMENTS

JP 2002-351843 12/2002

OTHER PUBLICATIONS

Fujikawa, M.; Doi, H.; , "Design of Access Control System Considering Usability and Security—Application of Vital Sign Sensing Technology—," Sensors for Industry Conference, 2005, vol., no., pp. 15-21, Feb. 8-10, 2005, ISA.*  
Hashimoto, J.; , "Finger Vein Authentication Technology and Its Future," VLSI Circuits, 2006. Digest of Technical Papers. 2006 Symposium on, vol., no., pp. 5-8, IEEE.*  
Sukhai, Nataliya, Access Control & Biometrics, Infosec Conference '04, Oct. 8, 2004, ACM.*  
Jain et al., Biometric Identification, Feb. 2000, vol. 43, No. 2, ACM.*  
Zhang et al., Palmprint Authentication System for Civil Applications, Springer Verlag, BioAW 2004, LNCS 3087, pp. 217-228, 2004.*

* cited by examiner

*Primary Examiner* — David Garcia Cervetti  
(74) *Attorney, Agent, or Firm* — Brundidge & Stanger, P.C.

(57) ABSTRACT

Inputted information (such as biometric information) is compared to template information (including correlation or authentication) and the result is recorded as log information. According to log information for each of the types of the inputted information (such as information specifying the user who has inputted it and the template), analysis is executed for the inputted information for each of the types. This analysis includes the following aspects. That is, the following states are detected and an alarm is outputted for the accuracy of the corresponding type: when the ratio of negative comparison results (correlation failures) not smaller than a predetermined value is detected within a predetermined period of time; and when a negative result is detected within a predetermined time before an affirmative comparison result is obtained.

9 Claims, 15 Drawing Sheets

(SYSTEM CONFIGURATION BLOCK DIAGRAM 1)

(SYSTEM CONFIGURATION BLOCK DIAGRAM 2)

FIG.3

(IDENTIFICATION LOG TABLE)

| ITEM NUMBER | ITEM | CONTENT |
| --- | --- | --- |
| 301 | SAMPLE COLLECTION DEVICE | ID CODE FOR IDENTIFYING A DEVICE |
| 302 | SAMPLE SERIAL NUMBER | SERIAL NUMBER FOR UNIQUELY SPECIFYING A SAMPLE COLLECTED FOR EACH OF DEVICES |
| 303 | COLLECTION DATE AND TIME | DATE AND TIME WHEN THE SAMPLE IS COLLECTED |
| 304 | SAMPLE | SAMPLE DATA |
| 305 | SAMPLE QUALITY | SAMPLE DATA QUALITY VALUE |
| 306 | NUMBER OF MATCHED TEMPLATES | NUMBER OF TEMPLATES AMONG THE REGISTERED TEMPLATES WHICH ARE MATCHED WITH THE SAMPLE (SHOWING A SIMILARITY DEGREE NOT LOWER THAN A THRESHOLD VALUE) |
| 307 | LIST OF MATCHED TEMPLATES | LISTS OF MATCHED TEMPLATES AND SCORES |

(LOG RECORDING FLOW 1: CLIENT IDENTIFICATION)

(LOG RECORDING FLOW 2: AUTHENTICATION SERVER)

FAILURE RATIO DISPLAYING GRAPH (TEMPLATE OVERLAP ID EVALUATION)

ACCOMPANYING PERSON OR UNAUTHORIZED MATCHING ANALYSIS (EXAMPLE MONITORING SCREEN)

(EXAMPLE OF DEVICE ANALYSIS SCREEN)

FIG.15

(EXAMPLE ID EVALUATION SCREEN IMMEDIATELY AFTER FAILURE)

| A ID ANALYSIS IMMEDIATELY AFTER FAILURE |
|---|

ANALYSIS PERIOD(PAST : ☐ DAYS)

| ID IMMEDIATELY AFTER | NUMBER OF CASES | DEVIATION VALUE OF THE NUMBER OF CASES | TEMPLATE ATTRIBUTE, etc. |
|---|---|---|---|
| | | | |
| | | | |
| | | | |
| | | | |
| | | | |
| | | | |
| | | | |

[RE-ANALYSIS] [FILE OUTPUT] [SETTING] [END]

FIG.16

(EXAMPLE OF TROUBLE REGISTRATION ID EVALUATION SCREEN)

| A TROUBLE REGISTRATION ID ANALYSIS |
|---|

ANALYSIS PERIOD(PAST : ☐ DAYS)

| REGISTERED TEMPLATE ID | NUMBER OF CASES OF PLURAL MATCHES | NUMBER OF CASES OF SINGLE MATCH | REGISTERED TEMPLATE ATTRIBUTE, etc. |
|---|---|---|---|
| | | | |
| | | | |
| | | | |
| | | | |
| | | | |
| | | | |
| | | | |

[RE-ANALYSIS] [WORKING RECORD MATCHING] [FILE OUTPUT] [SETTING] [END]

FIG.17

(EXAMPLE OF WORKING RECORD MATCHING SCREEN)

WORKING RECORD MATCHING WINDOW

WORKING RECORD FILE : RECORD txt OF AUGUST 2006

LIST OF MATCHED LOGS OF ABSENCE

| LOG No. | COLLECTION DEVICE ID | DATE AND TIME | NUMBER OF MATCHES | ID, SCORE OF No.1 | No.2 ID, |
|---|---|---|---|---|---|
| | | | | | |
| | | | | | |
| | | | | | |

ANALYSIS OF IDENTIFICATION TRIAL DURING WORKING DAYS

| STAFF ID | NUMBER OF MATCHES | AVERAGE NUMBER OF CASES / DAY | DEVIATION VALUE | ATTRIBUTE, etc. |
|---|---|---|---|---|
| | | | | |
| | | | | |
| | | | | |
| | | | | |
| | | | | |
| | | | | |
| | | | | |

[ FILE OUTPUT ]  [ SETTING ]  [ END ]

AUTHENTICATION SYSTEM MANAGING METHOD

BACKGROUND OF THE INVENTION

The present invention relates to a system for comparing data acquired by an input device to template information stored in advance and calculating the comparison result and in particular, to the technique for managing/operating the system. This includes a system using imaged data captured by an imaging device such as a camera. Moreover, the present invention relates to the technique for using so-called biometric information (vein (hand front side and rear side, finger), fingerprint, iris, retina, key stroke, face image, handwriting (signature), DNA) and identifying (or matching) the information as well as the technique for operating/managing the system.

JP-A-2002-351843 discloses a conventional technique for operating and managing a system which compares data acquired by an input device to template information and calculates the comparison result. JP-A-2002-351843 has a description relating to template storage and operation for building a user authentication system using biometric information. In JP-A-2002-351843, in order to reduce the cost for storing and operating a template, the template generated according to the biometric information inputted by a user is combined with the template stored in advance so as to re-register a template. More specifically, a part of the template of the biometric information is stored upon registration and the part of the template is combined with the biometric information inputted upon re-registration so as to generate "a complete" template. With this configuration, only a part of the biometric information is stored, which improves the security and reduces the psychological resistance of the user (personal information is stored).

Moreover, JIS-TR X0086:2003 "Evaluation Method for Accuracy of Face Authentication System", 3.3 Summary (p.9 to p.14) disclosed on Apr. 1, 2003 discloses a technique for evaluating a system for comparing the data acquire by an input device to the template information stored in advance and calculating the comparison result. In this document, the template inputted by a user is correlated with a user identifier when they are stored and the collected templates are combined so as to calculate an another person acceptance ratio, a valid person rejection ratio, and an accumulated identification ratio.

SUMMARY OF THE INVENTION

However, JP-A-2002-351843 has no consideration on the accuracy of the operation of the biometric authentication (matching) system. Moreover, in JIS-TR X0086:2003 "Evaluation Method for Accuracy of Face Authentication System", 3.3 Summary (p.9 to p.14) disclosed on Apr. 1, 2003, the algorithm as a product uses a device and a system as evaluation objects and no consideration is taken on the accuracy of the actual operation after installation. Especially when main authentication is performed by biometric information without inputting an identifier (such as a password) for a correct answer, an operation risk may be caused because no consideration is taken on the degree of the accuracy (likelihood of the information) of the handled biometric information (or other information). For example, an authentication (matching) of low accuracy may occur or a valid person may be identified as another person by an authentication of an unnecessarily high accuracy. Here, if the accuracy is identified by using information such as an identifier, there arise various problems such as information processing, i.e., treating of extra information and lowering of user friendliness.

It is therefore an object of the present invention to provide a technique for avoiding the aforementioned problems and comprehending the operation actual state and accuracy. In order to achieve the object, according to the present invention, the result of comparison (including matching and authentication) between the inputted information (such as biometric information) and the template information is recorded as log information and analysis concerning the input information is performed for each of types according to the log information (such as information on a user who inputs the type and information for specifying the template). This analysis includes an aspect as follows. That is, (1) when the ratio of negative comparison results (matching failures) detected is higher than a predetermined value within a predetermined period or (2) when a negative result is detected within a predetermined time before the comparison result becomes affirmative, an alarm concerning the accuracy of the corresponding type is outputted.

Moreover, the present invention includes a process for storing a plurality of templates, each of which is compared to the input information, a process for outputting the comparison result if the result is affirmative (matching), and a process for performing a comparison of the templates not yet compared. For example, in case of an entering-room control, when the template information corresponding to the inputted biometric information is detected, an unlocking process for entering and a comparison (correlation) process with template information not yet compared (correlated) are performed.

More specifically, the present invention includes the following aspects.

The present invention includes a method for managing an authentication system which compares input information inputted by a user to a plurality of templates stored in advance in a storage device so as to authenticate the user, wherein the authentication system: stores the plurality of template information; receives the input information via an input device; compares the input information to the plurality of template information so as to judge whether template information corresponding to the input information exists; acquires log information indicating an authentication condition of the authentication system including the result of the judgment and stores it in the storage device; and compares the stored log information to accuracy evaluation information indicating the accuracy evaluation of the authentication system predetermined for the authentication system and outputs an alarm if the log information is deviated from the accuracy evaluation information by a predetermined value or above. Moreover, the present invention also includes a method for managing an authentication system which: has a plurality of input devices; stores the number of times when no template information corresponding to the input information is found for each of the input devices as the log information; and outputs the alarm if the number of times is equal to or above a predetermined value and/or the number of times is larger than the other input devices by a predetermined condition or above.

Moreover, the present invention also includes a method for managing an authentication system which: includes information indicating quality of the input information as the log information. The present invention also includes a method for managing the authentication system which: correlates the plurality of template information to the identifiers capable of identifying the template information and stores them; identifies the identifier correlated by the template information when corresponding template information is judged to be present;

and outputs an alarm if any identifier has the number of times when the input information quality which is equal to or below a predetermined threshold value and/or the number of times is larger than the other identifiers by a predetermined condition or above.

Moreover, the present invention also includes a method for managing an authentication system which: judges that the template information exists if the matching degree indicating a matching degree between the input information and the template information is equal to or above a predetermined value.

Moreover, the present invention also includes a method for managing an authentication system which: outputs information giving a permission to the user if the template information is judged to be present; and compares the plurality of template information to the input information in a predetermined order so as to judge whether the template information exists and upon detection of the template information corresponding to the input information (1) outputs information giving a permission and (2) continues comparison between the input information and the template information whose comparison is not yet completed, thereby continuing acquisition of the log information.

Moreover, the present invention also includes a method for managing an authentication system which: is connected to a plurality of input devices; stores the plurality of template information in the storage devices while correlating them to identifiers capable of identifying the template information; and inputs input information within a predetermined time from the moment when it is judged that no corresponding template information exists in the first input device among the plurality of input devices or from the moment when the input information is inputted for the judgment and outputs an alarm indicating (1) a problem of input and/or (2) a problem of the template information for a user indicated by the identifier corresponding to the template information if judgment that the comparison result with the input information has corresponding template information is executed repeatedly by a predetermined number of times.

Furthermore, the present invention also includes an authentication system for executing the aforementioned managing methods, a computer program for realizing the managing methods, and a storage medium containing the program. Furthermore, the authentication system may be a so-called information processing device not including an input device and includes a device (such as a door) executing a predetermined process according to an authentication result.

The present invention enables management of an information input system (including an authentication system) appropriate for the actual conditions.

BRIEF DESCRIPTION OF THE DRAWINGS

FIG. 3 is an identification log table (contents of identification log) according to an embodiment of the present invention.

FIG. 15 shows an example of the display screen according to embodiment 4 of the present invention.

FIG. 16 shows an example of the display screen according to embodiment 5 of the present invention.

FIG. 17 shows an example of the display screen according to embodiment 6 of the present invention.

DESCRIPTION OF EMBODIMENTS

Description will now be directed to embodiments of the present invention with reference to the attached drawings. The embodiments of the present invention will be explained as an authentication system for authenticating a person by using vein information (biometric information) but the present invention is not to be limited to this.

Embodiment 1

Figure 1:
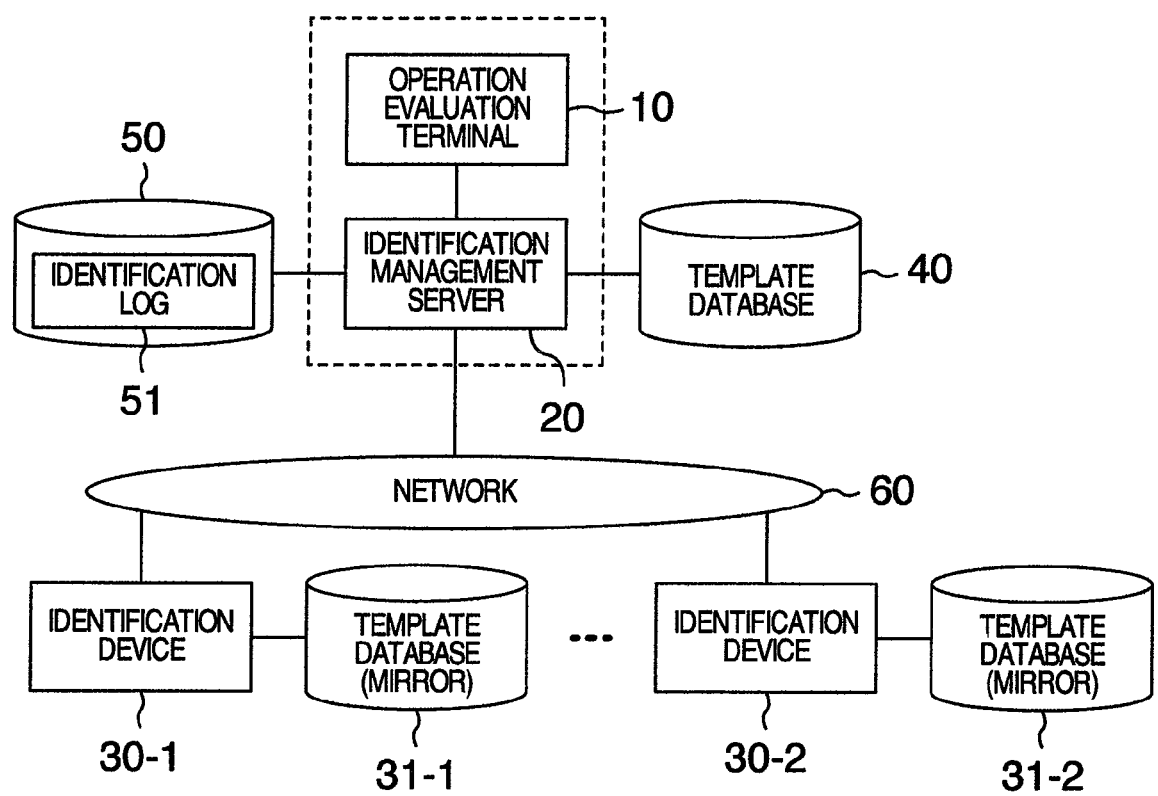
FIG. 1 is a block diagram showing a system configuration according to embodiment 1 of the present invention.

Firstly, FIG. 1 shows a system configuration according to embodiment 1. Respective devices (computers) are connected to one another via a network. Moreover, each of the computers includes a storage device such as a memory and a hard disc and a processing device such as a CPU. The processing device executes information processing according to a program stored in the storage device. As shown in FIG. 1, in embodiment 1, identification devices 30-1, 2, . . . arranged for each door executes individual authentication by comparing vein information inputted by a user to template information on the veins of authenticated users stored in template databases (mirror) 31-1, 2 . . . (this processing will be detailed later with reference to FIG. 4). The log information including the authentication results is transmitted to an identification server 20 which performs the management process in the present embodiment and stored as the identification log 51 in an identification log database 50. Moreover, the original template information may be held as a template database 40. Moreover, for the management in the identification management server 20, there also exists an operation evaluation terminal 10 which outputs an alarm and inputs an instruction to the identification management server 40. It should be noted that the operation evaluation terminal 10 and the identification management server 20 may be arranged as a unitary block. In this embodiment 1, an authentication process is executed for each of the identification devices 31.

Figure 4:
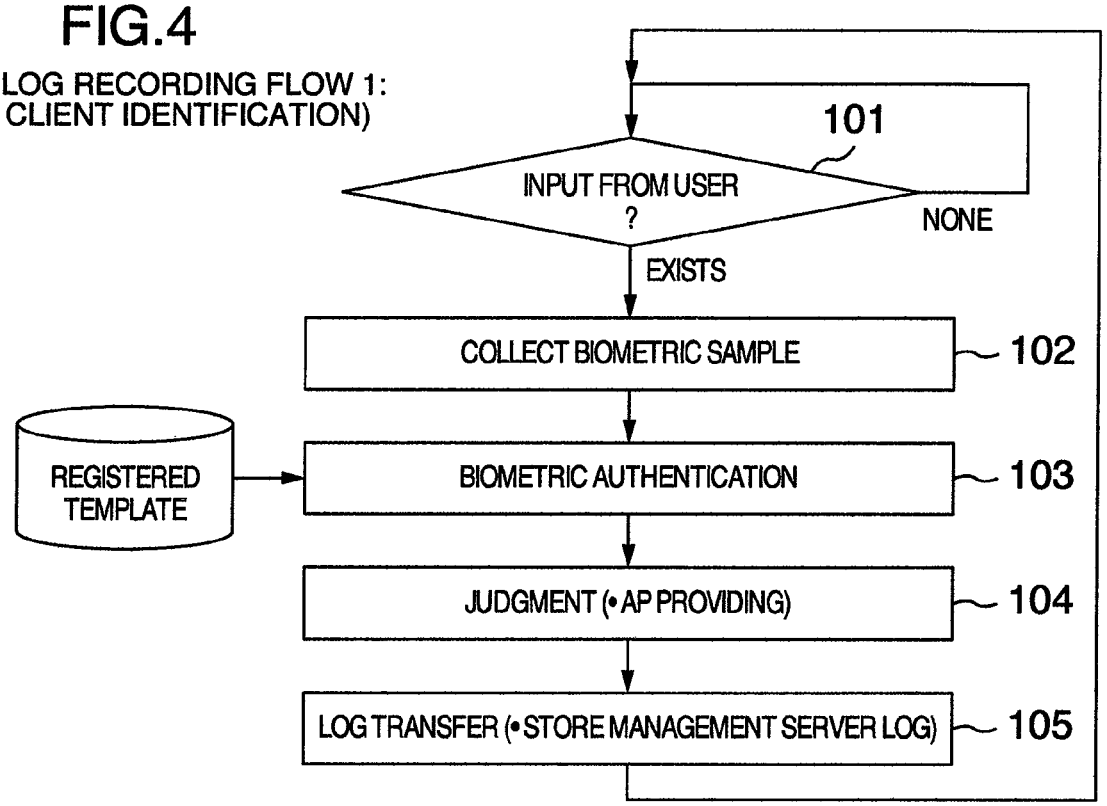
FIG. 4 is a flowchart showing an authentication process according to embodiment 1 of the present invention.

Next, referring to FIG. 4, explanation will be given on the authentication process (including collection of log information) as a process of embodiment 1. Firstly, the identification device 30 judges whether vein information is inputted by a user. That is, it is judged whether a user has put his/her body portion such as a finger on an input unit (not depicted) of the identification device or whether the vein image of the portion has been read. It should be noted that if it is judged that no input has been made, the device enters a wait state again.

When an input is made, the identification device 30 acquires a living sample, i.e., vein information from the user in step 102. Here, the living sample may be a partial image instead of the entire image of the input image. In step 103, the identification device 30 executes biometric processing. That is, the acquired vein information is compared to the template information stored in the template database 31 so as to calculate the matching degree indicating the matching degree with the inputted vein information.

In step 104, the identification device 30 executes judgment (·providing AP). The judgment process searches for template information having the matching degree not smaller than a threshold value. If such template information is found, it is judged that the authentication is successful (affirmative judgment). When the authentication is successful, information processing is executed for proving AP (application) such as an entering a predetermined area, access to predetermined information via a personal computer, and a transaction start by an ATM. In step 105, the identification device 30 transmits the log information including the authentication result to the identification log database 50 via the network 60. The log information may be information having the items as shown in FIG. 3.

Embodiment 2

Figure 2:
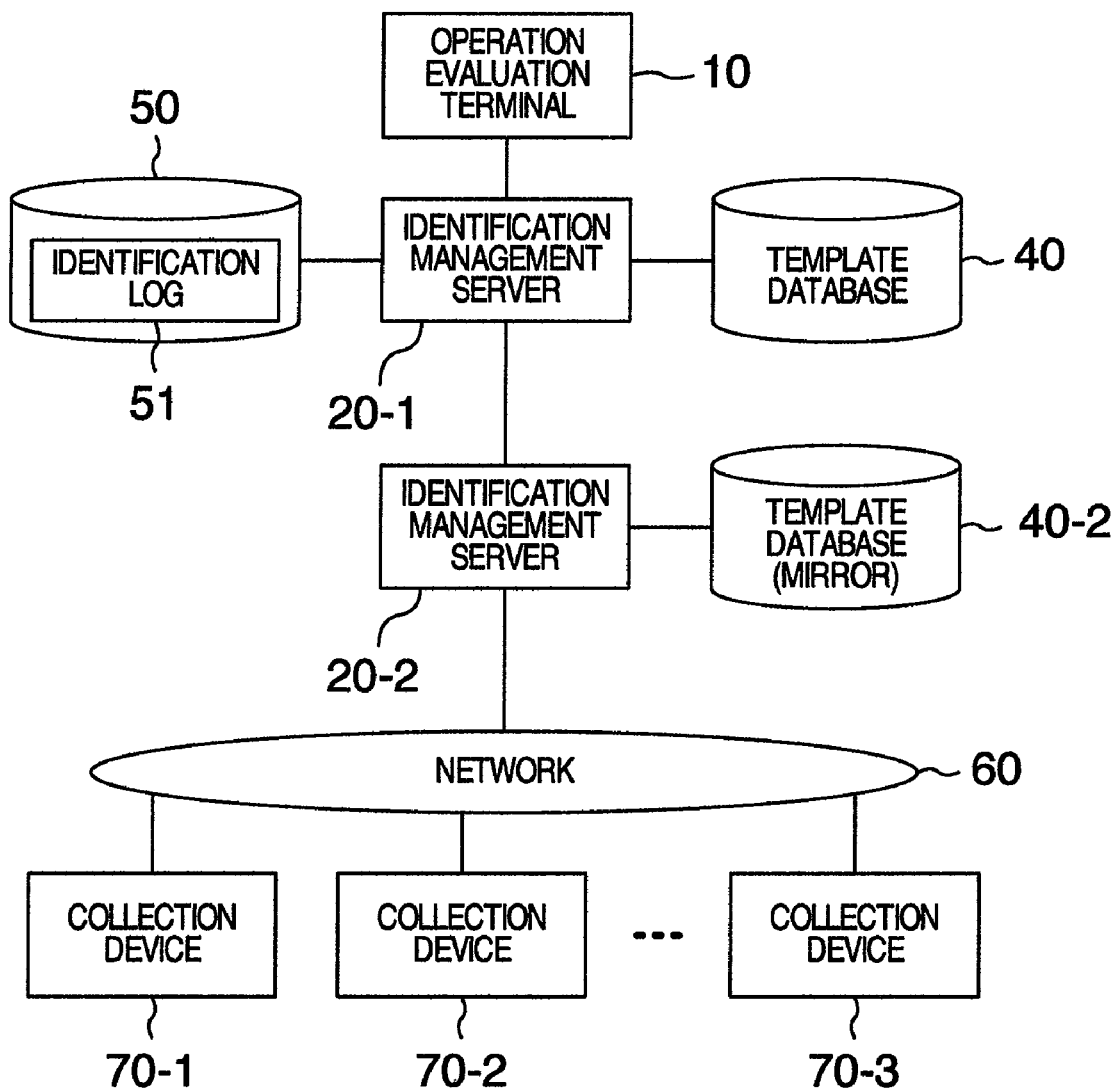
FIG. 2 is a block diagram showing a system configuration according to embodiment 2 of the present invention.

Next, FIG. 2 shows a system configuration according to embodiment 2. Moreover, respective devices (computers) are connected to one another via a network. Each of the computers includes a storage device such as a memory and a hard disc and a processing device such as a CPU. The processing device executes information processing according to a program stored in the storage device. Unlike the embodiment 1, in the embodiment 2, the center side, i.e., an authentication management server 20 executes various processes. As shown in FIG. 2, in the embodiment 2, collection devices 70-1, 2, 3 . . . arranged for the respective doors transmit the vein information inputted by users to at least one of the identification management servers 20 via the network 60. The authentication management server 20 executes individual authentication by making comparison with template information on the veins of authorized users stored in the template database 40 (this processing will be detailed later with reference to FIG. 5). The log information including these authentication results is stored as identification log 51 in the identification log database 50. Moreover, the management of the identification management server 20 uses an operation evaluation terminal 10 for outputting an alarm and inputting an instruction to the identification management server 20. It should be noted that the operation evaluation terminal 10 and the identification management server 20 may be formed as a unitary block. Moreover, the embodiment 2 uses a plurality of identification management servers 30-1, 2 and a plurality of template databases 40-1, 2. However, it is also possible to use only one identification management server and only one template database.

Figure 5:
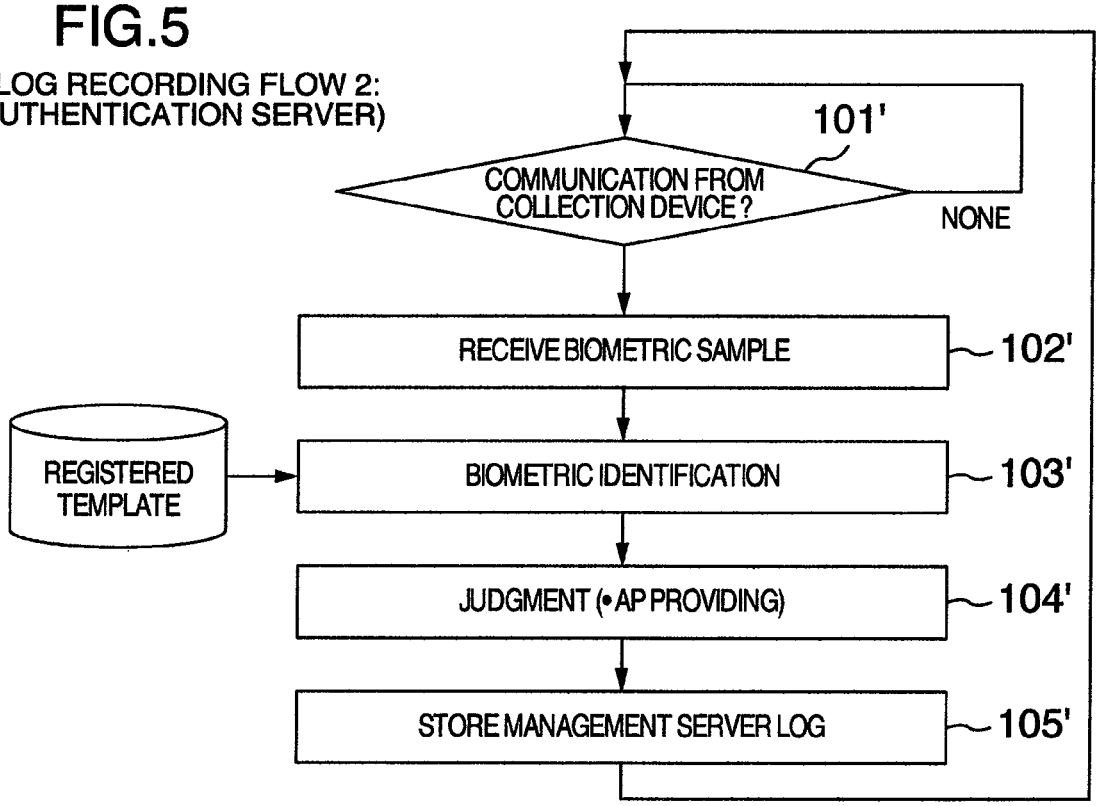
FIG. 5 is a flowchart showing an authentication process according to embodiment 2 of the present invention.

Next, referring to FIG. 5, explanation will be given on the authentication process (including collection of log information) as a process of the embodiment 2. Firstly, in step 101', the identification management server 20 judges whether any data has been transmitted from the collection device 70. If it is judged that no transmission has been made, the wait state for input is set in again.

When a transmission has been made, in step 102', the identification management server 20 receives a living sample, i.e., vein information inputted from the user to the collection device 70. Here, the living sample may be a partial image instead of the entire image of the input image. In step 103, the identification device 30 executes biometric processing. That is, the acquired vein information is compared to the template information stored in the template database 31 so as to calculate the matching degree indicating the matching degree with the inputted vein information.

In step 104, the identification management server 70 executes judgment (·providing AP) process. The judgment process searches for template information having the matching degree not smaller than a threshold value. If such information is found, it is judged that the authentication is successful (affirmative judgment). When the authentication is successful, information processing is executed to provide AP (application) such as entering a predetermined area, access to predetermined information via a personal computer and a transaction start at an ATM. In step 105', the authentication management server 20 transmits the log information including the authentication results to the identification log database 50 via the network 60. The log information transmitted may include the items shown in FIG. 3.

Embodiment 3

Figure 6:
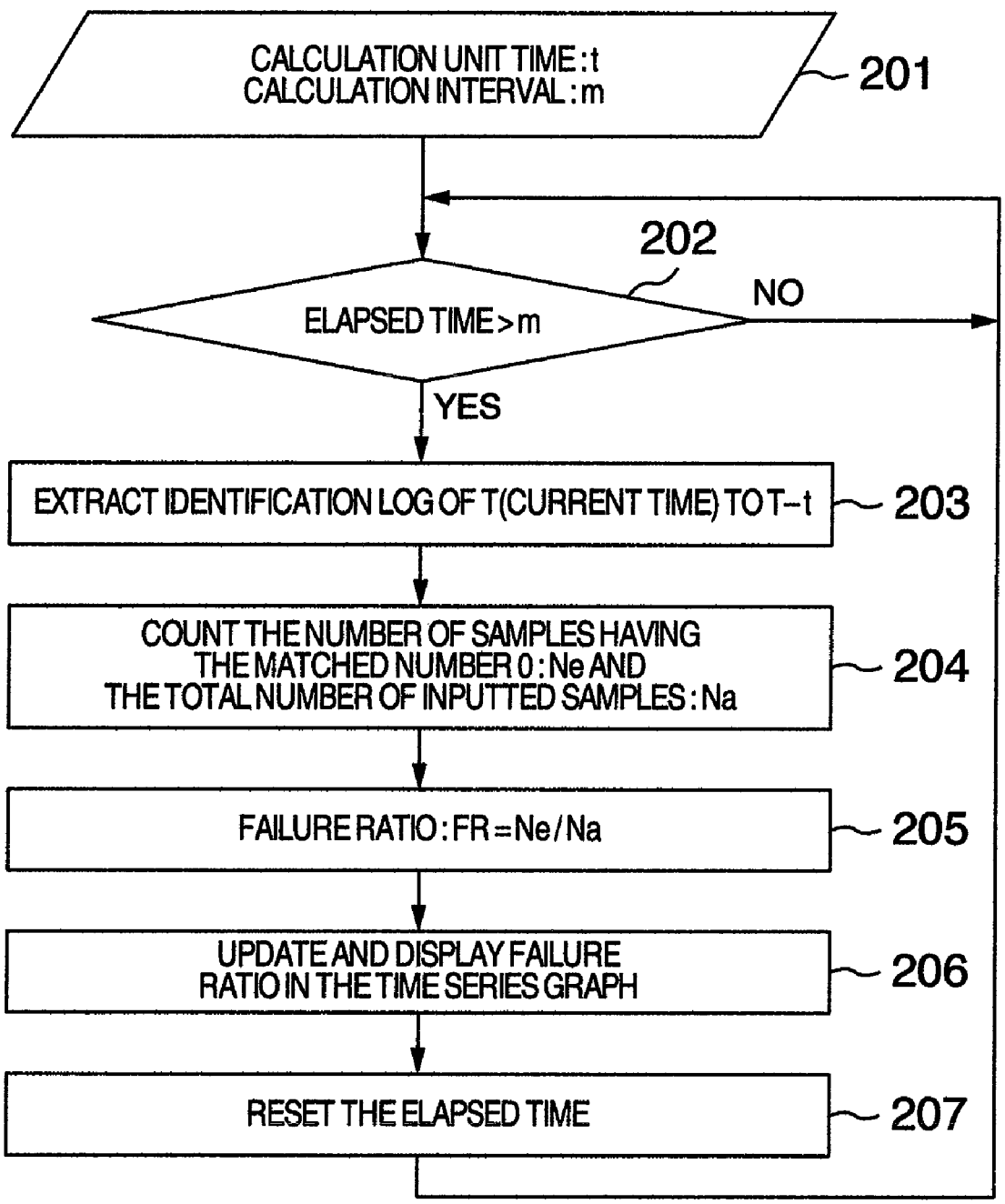
FIG. 6 is a flowchart showing a failure ratio monitoring process according to embodiment 3 of the present invention.

Next, referring to FIG. 6, explanation will be given on a failure ratio monitoring process in embodiments 1 and 2. Here, the process is executed by the identification device 30 in the embodiment 1 and by the identification management server 20 in the embodiment 2.

Firstly, in step 201, the aforementioned identification device 30 (or the identification management server 20) sets the calculation unit time t and the calculation interval m serving as the references of the process. This may be recorded in accordance with the input by an administrator. Moreover, m may be set according to the history of the time until the log storage quantity reaches a predetermined value.

Next, in step 202, it is detected whether m time has elapsed from the previous calculation time. If yes, control is passed to step 203. Otherwise, the time detection process is continued. In step 203, the identification log from T (reference time such as the current time) to the time preceding by t is extracted from the identification log database 50. Here, the extraction is executed by using the item 303 "collection date and time".

Next, step 204 calculates the number (Ne) of samples (identification logs) of the matching amount 0 and the number (Na) of the samples (identification logs) which have been inputted (or the log is recorded for the input). That is, this step calculates the number of matched templates of the item 306 of the extracted identification log which indicates 0 and the total number. In this case, when inputting (or authenticating) biometric information, classification (such as sorting) may be performed in accordance with the matched number when recording is performed. Moreover, each time biometric information is inputted (or authenticated), it is counted and stored in the identification log database 51 so as to be used (in this case, it is possible to omit the step 203 and the like).

Next, step 205 calculates the failure ratio FR=Ne/Na. Here, as has been described above, each time when inputting (or authenticating) the biometric information, it is possible to calculate the failure ratio.

Figure 7:
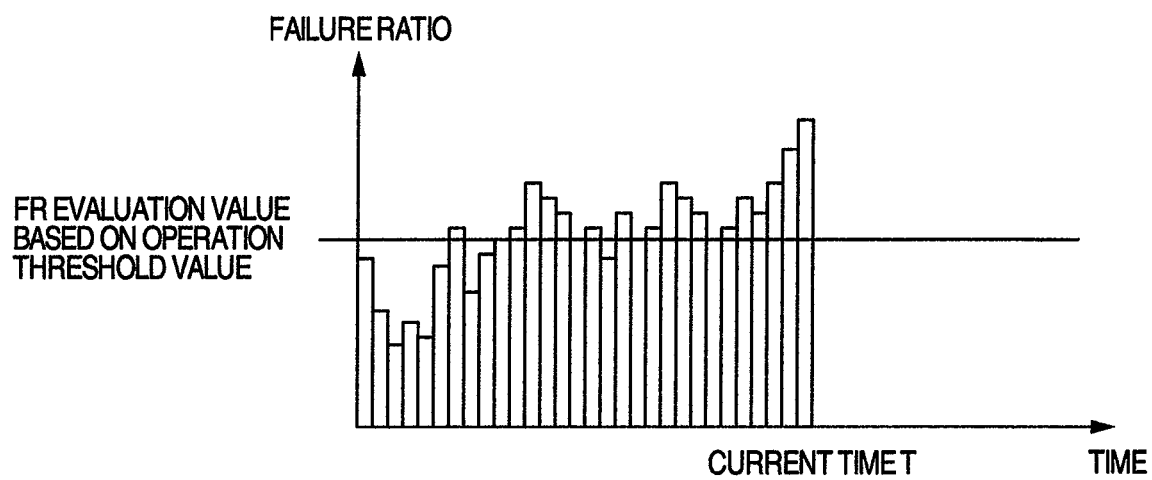
FIG. 7 shows a display example of failure ratios.
Figure 13:
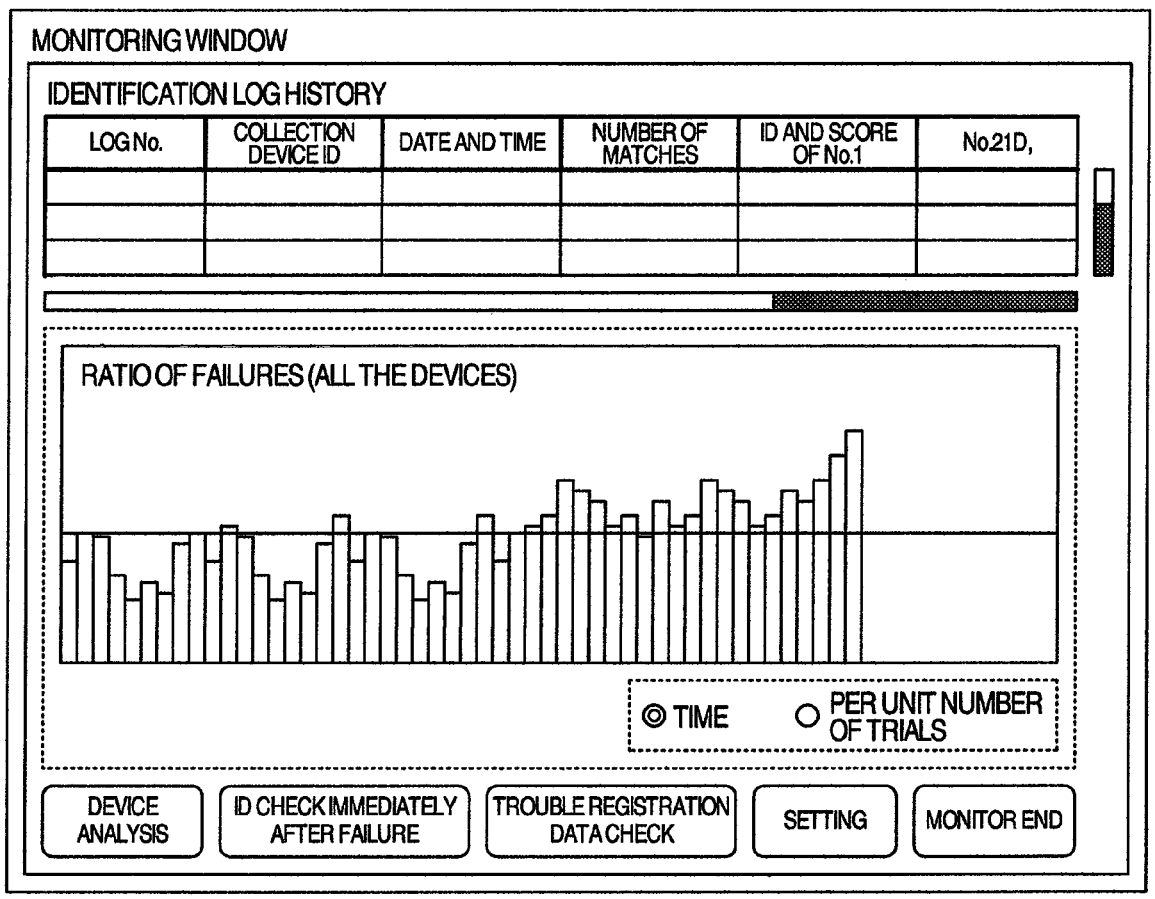
FIG. 13 shows an example of the display screen according to embodiment 3 of the present invention (1).

As is required, in step 206, the result of the step 205 is made into a graph, which is displayed. FIG. 7 shows the contents of the graph. This shows the failure ratio for each of the aforementioned t. Moreover, the failure ratio is compared to a predetermined FR evaluation value regardless of whether the failure ratio is displayed or not displayed. In this case, when a predetermined condition is satisfied such as when the FR evaluation value is exceeded, an alarm is outputted. The predetermined condition includes a case when the ratio is significantly increased as compared to the FR evaluation value, a case when the condition exceeding the FR evaluation value has continued by a predetermined number of times or above, and a case when a pattern similar to the inclination defined as an abnormal state in the past has appeared. Moreover, the display screen may also display the identification log history as shown in FIG. 13.

Step 207 resets the elapsed time and control is returned to step 202, thereby terminating the process.

Figure 8:
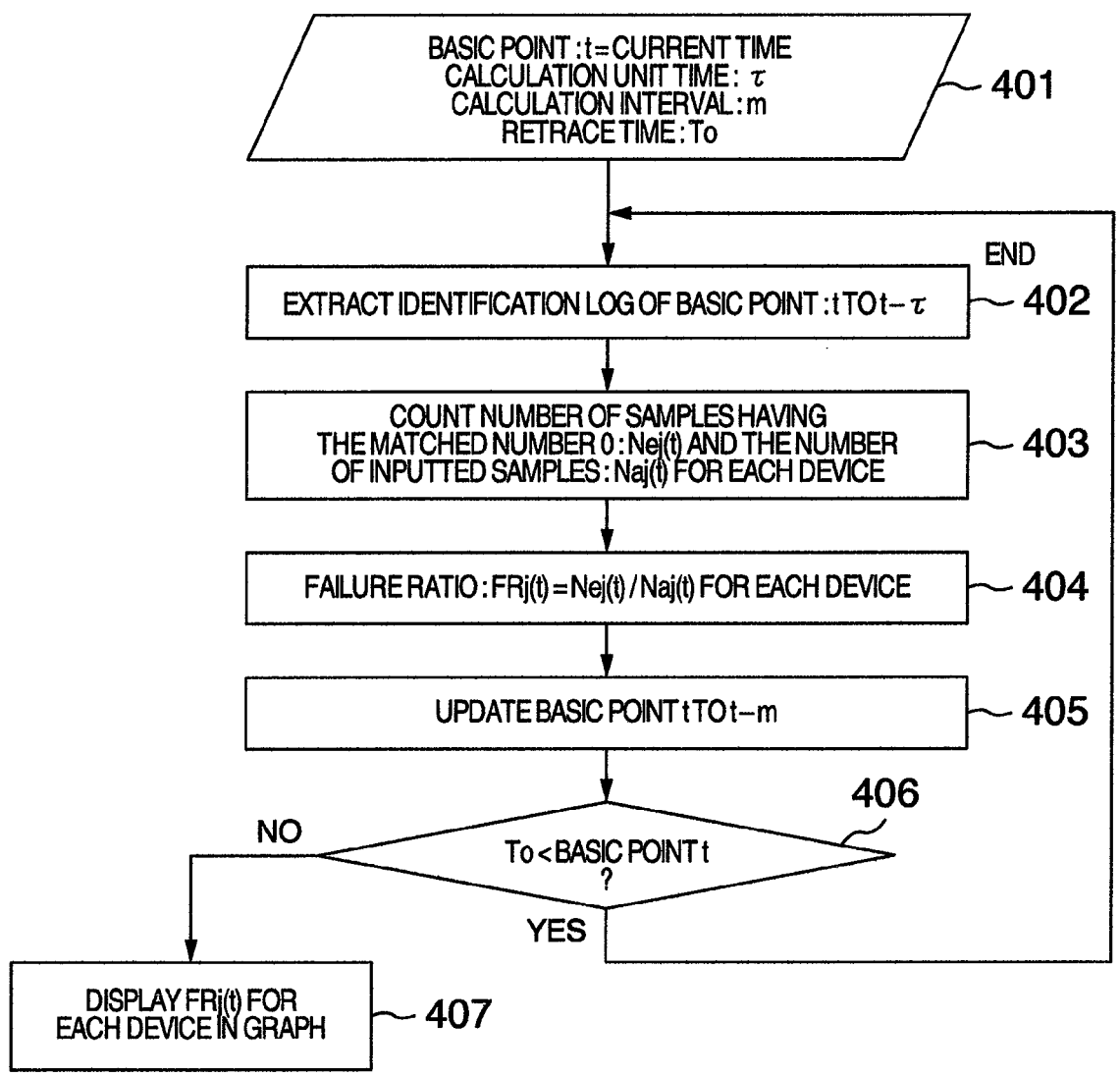
FIG. 8 is a flowchart of detailed failure ratio analysis according to embodiment 3 of the present invention (1).
Figure 9:
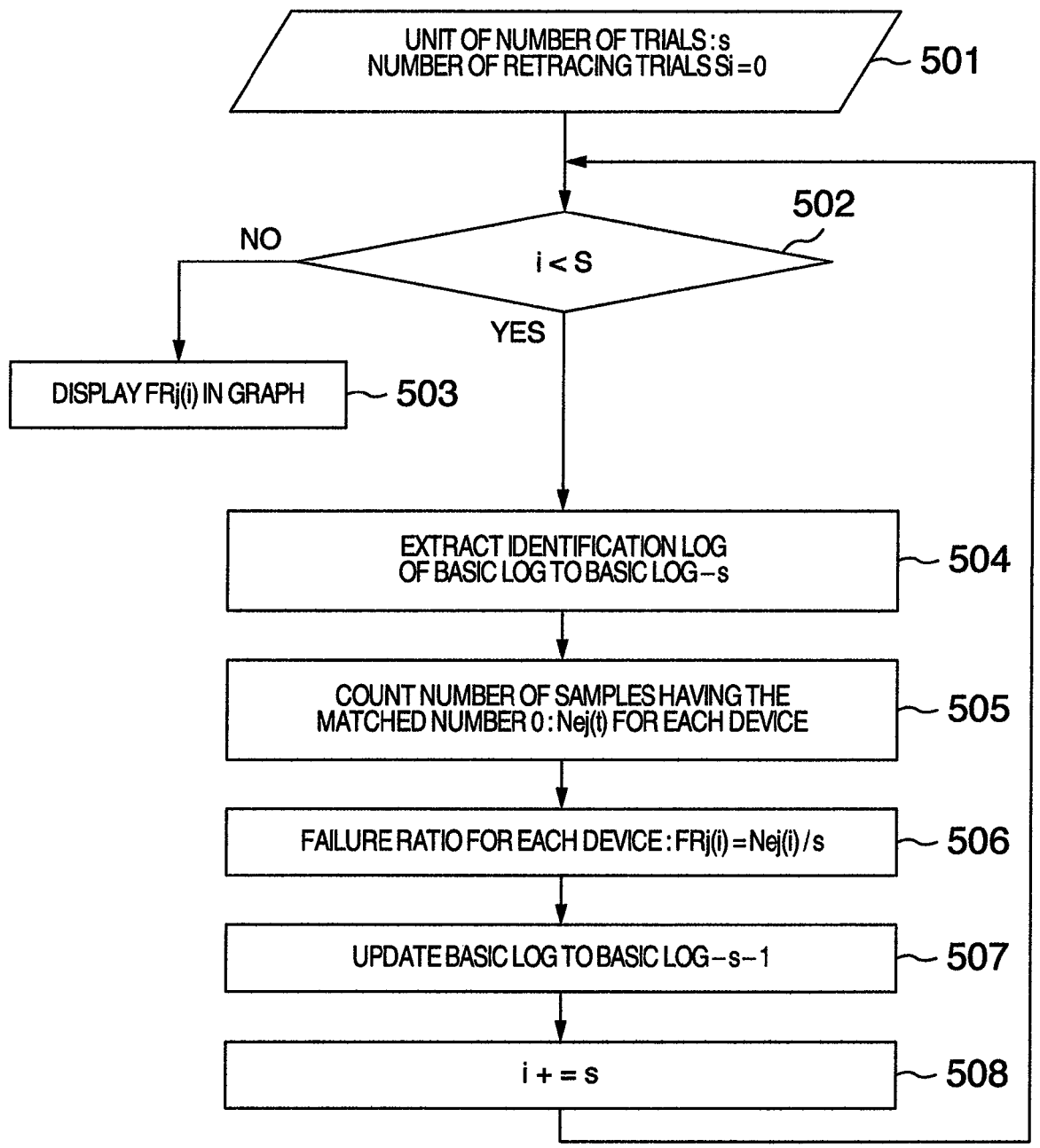
FIG. 9 is a flowchart of a detailed failure ratio analysis according to embodiment 3 of the present invention (2).

Next, referring to FIG. 8 and FIG. 9, explanation will be given on two methods for detailed failure ration analysis as an analysis for the failure ratio in the respective identification device and the collection device. That is, since the respective identification devices and the collection devices are installed in different places, the environment such as the way how the light (external light) is applied to the biometric information input unit (image input unit). For this, the entire system evaluation (reliability) may be degraded by a local factor of the device (or the one limited to it). The present process identifies the factor (or the device causing the factor) and calculates the failure ratio for each of the devices in a graph display or the like. It should be noted that like the failure ratio monitoring process, this process is executed by the identification device 30 in the embodiment 1 and by the identification management server 20 in the embodiment 2.

Firstly, referring to FIG. 8, explanation will be given on the detailed failure ratio analysis process 1. In step 401, the aforementioned identification device 30 (or the identification management server 20) sets in advance, a calculation unit time τ, a calculation interval m, and a retrace time T0 of a start point t (such as the current time) serving as the reference of the process. This may be recorded in accordance with the input by the administrator. This setting may be determined according to the identification log amount like in step 201.

Next, step 402 extracts the identification log between the set start point t and t-τ from the identification log database 51. This can be executed by the process similar to step 203. Moreover, it is also possible to hold the failure ratio monitoring process result shown in FIG. 6 in a separate database so as to be extracted from here.

Next, step 403 calculates the number (Nej) of samples (identification logs) of the match number 0 among th extracted identification logs and the number (Naj) of samples (identification logs) which has been inputted (or the log for the input has been recorded) for each of the devices (collection device, identification device). That is, a sort process is executed for each device by the item 301 of the extracted identification log so as to calculate the number of matched templates of the item 306 of the identification log which indicate 0 and the total number. In this case, classification (such as sorting) may be recorded in accordance with the number of matches when inputting (or authenticating) the biometric information. Moreover, it is also possible to perform counting each time when the biometric information is inputted (or authenticated) and store it in the identification log database 51. That is, the process similar to step 204 is executed by distributing it to the respective devices. Moreover, when the process is executed in the identification device 30 (embodiment 1 in FIG. 1), the respective identification devices 30 can hold the identification log database and the item 301 may be omitted.

Next, like 205, the failure ratio of each device $FRj(t)=Nej(t)/Naj(t)$ is executed. Then, control is passed to step 405, where the reference point is modified from the next reference point t to t−m. Control is further passed to step 406, where it is judged whether modification is enabled in accordance with T0<t. If the modification is judged to be enabled, control is returned to step 402, where the failure ratio per the next unit time is calculated. When the modification is disabled, that is, when each unit time calculation is completed, the failure ratio of each of the devices is displayed. Here, the process may be executed in the same way as step 206. Moreover, an alarm may be outputted for the devices (several uppermost devices) having a numeric value greater than the other devices or for the devices having a value exceeding a predetermined threshold value.

Next, referring to FIG. 9, explanation will be given on the detailed failure ratio analysis process 2. Here, upon each authentication, input, or log reception, it is counted and recorded in each device. When the value has reached a reference value, the process is executed. The number of times may be calculated from the FR evaluation value as the operation threshold value. For example, it is possible to define the number of times as 3/FR evaluation value of the operation threshold value, which is calculated, so that the present process is executed by a trigger when it is detected that the number of times satisfies this. Moreover, this process may be executed for the device which has satisfied the number of times. alternatively, this process may be started when each device has satisfied the number of times.

Firstly, in step 501, the aforementioned identification device 30 (or the identification management server 20) sets in advance, the number-of-trials (the number of inputs, authentication times) unit s and the number of trials S indicating the number of trial logs retracing from the reference time as the object. These may be set like in steps 401 and 201. Moreover, the current number of trials i is set to 0 as the initial value.

Next, in step 502, comparison between I and S is performed. That is, it is checked whether the number of inputs of the biometric information received up to now has reached S. If the S is achieved, i.e., if the aforementioned number of reference value is completed, control is passed to step 503, where a graph display like step 407 is executed. If the S is not achieved, the identification log retracing from the identification log of the reference point by s is extracted. This can be realized by the same process as step 402. Hereinafter, the processes of steps 505 to 508 are executed like steps 403 to 405.

Figure 14:
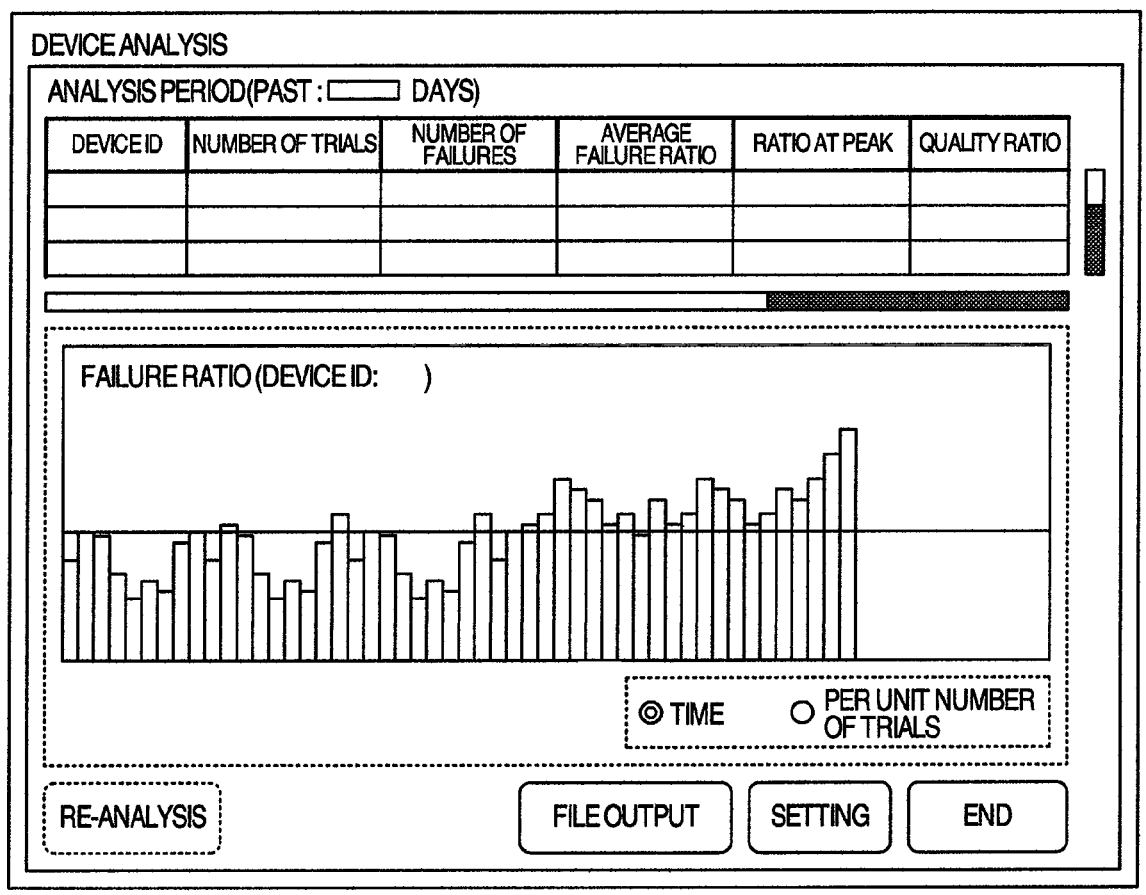
FIG. 14 shows an example of the display screen according to embodiment 3 of the present invention (2).

It should be noted that the graph display in the detailed failure ration analysis 1, 2 may be performed like in FIG. 14. Here, the horizontal line in the graph is the FR value as the threshold value.

Embodiment 4

Figure 10:
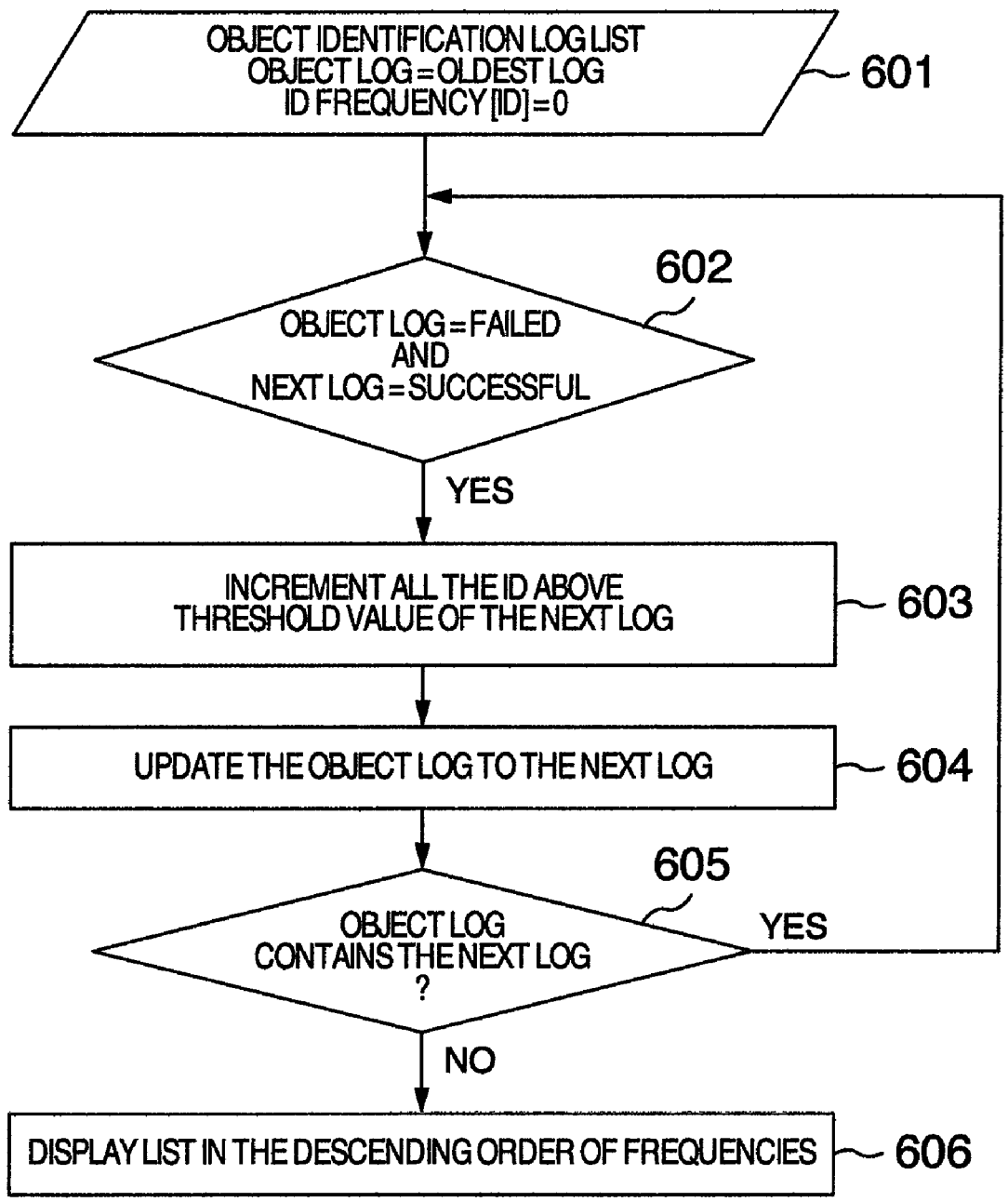
FIG. 10 is a flowchart of an immediately-after identifier frequency evaluation process according to embodiment 4 of the present invention.
Figure 11:
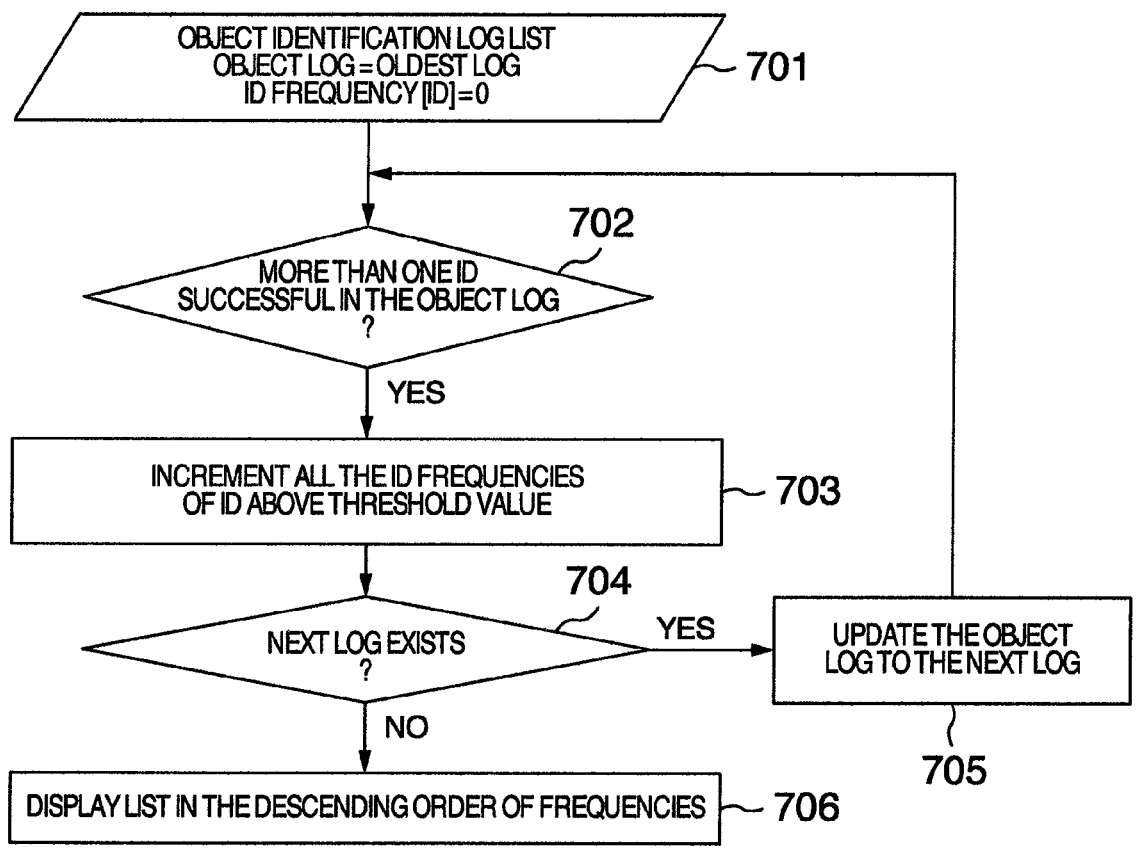
FIG. 11 is a flowchart of template duplication identifier evaluation process according to embodiment 5 of the present invention.

Next, referring to FIG. 10, explanation will be given on the immediately-after identifier frequency evaluation process for detailed analysis of the failure contents as the embodiment 4.

In this process, identifies a user (or narrow the range of users) who has failed authentication (no registered template corresponding to the input biometric image has been searched). Normally, when the authentication has failed, the user performs retrial. By using this tendency, the present process specifies the user (or the candidate of the user) who has failed in the authentication. This process may be executed upon each authentication process or may be executed at an appropriate timing for some authentication processes all at once.

In this process, firstly, the aforementioned authentication device 30 (or the identification management server 20) specifies an identification log as an object in step 601.

Next, step 602 judges whether the identification log of the specified object has failed and the next trial in the same device is successful. That is, it is judged whether the matched template of the item 306 of the object identification log is 0 and whether the matched template of the item 306 of the next trial identification log is 1 or more (or other than 0). It should be noted that the condition of this step may be that a retrial is performed within a predetermined time from the object log or a combination with this, i.e., a retrial is performed within the predetermined time and the next identification log is successful. Moreover, when retrials are performed continuously within the predetermined time, it is possible to extract a portion where a failure is switched to a success.

Next, step 603 specifies an identifier corresponding to the matched plate of the item 307 of the next identification log satisfying the condition of step 602. For each of the identifiers, the number (which satisfies the present condition) is totaled.

Next, step 604 updates the object identification log to the next identification log. If the next identification log is present in step 605, control is returned to step 602 so as to continue the process. Otherwise, control is passed to step 606 and the calculation results of step 603 are outputted. The results may be outputted, for example, in the descending order of frequencies (counted numbers) in a list. This example includes the display screen shown in FIG. 15. By performing display in this way, it is possible to identify an identifier of the user for whom necessity of a countermeasure can be estimated. Moreover, the identifier may be the identifier of the device of the item 301 of the identification log. In this case, it is possible to specify a device in which more retrials are performed.

Moreover, this process may include output of an alarm requiring a countermeasure such as an output of this display when a predetermined frequency is exceeded.

It should be noted that the present process may also be executed as follows. When the number of matched templates is 0 upon registration of the identification log, a flag 1 is set and it is kept as it is (or 0) if 1 or above (successful). When executing the present step, AND of the aforementioned flag is calculated for the adjacent identification log (when in time series in the same device) so as to extract the on having the result 1. Moreover, it is also possible to distinguish and record only the identification logs which have failed in the authentication, which are extracted so as to judge whether the next identification log is successful or not in the authentication. It should be noted that as has been described above, the condition in this process may be that a retrial has been made within a predetermined time from the object log or a combination with this, i.e., a retrial has been performed within the predetermined time and it is successful in the next identification log. Moreover, when retrials are continuously performed within a predetermined time, it is possible to extract a portion where a failure is switched to a success.

Moreover, for each of identifiers, the number (Ns) of successful results in the previous identification log is calculated, the number (Nes) of cases accompanied by a failure is counted, the normalized frequency=Nes/(Ns+Nes) is calculated. Furthermore, when the present process is successively executed for each of the trials, it is possible to suppress the present process for the device (item 301) of the identifier exceeding a predetermined frequency within a predetermined period of time. This cam suppress the calculation amount.

Here, if the identifiers are correlated to the user identifiers, it is possible to narrow (candidates of) users who tend to fail to a certain degree. Normally, a user who has once failed performs a retrial several times until he/she can succeed. Accordingly, if a success occurs after a failure, it is possible to estimate that the user of the failure and the user of the success are identical. This process utilizes this tendency. Moreover, the characteristic that a retrial is performed at a shorter interval than a normal next trial can also be utilized. (Since there exists a user who has succeeded but thinks that he/she has failed, this method may not be appropriate and consideration may be taken to identify such a user and notify him/her.) Moreover, it is also possible to identify a device (collection device, identification device) where such uses are often performed.

Embodiment 5

Next, as embodiment 5, explanation will be given on the template duplicate identification evaluation process. When a plurality of registration templates are present corresponding to input information (when a plurality of registration templates can be judged to be successful in authentication), there may be a problem that the judgment reference such as the similarity is loose (this problem includes a possibility that the template itself has a problem). Especially when a great number (as compared to others) of corresponding registration templates are present, the problem becomes remarkable. The outline of the present process is to identify a candidate of such a trial (or a user, a device).

In order to solve this problem, the present embodiment executes an output of the authentication result (or control (such as unlock) accompanying it) prior to or in parallel (even partially) with the process for generating an identification log.

In this process, firstly, the aforementioned identification device 30 (or the identification management server 20) identifies an identification log to be an object in step 701. This may be identical to step 601.

Next, step 702 judges whether more than one templates are successful in the object identification log according to the number of matched templates of the item 306. If more than one templates exist, control is passed to step 703.

For the plurality of identification logs, step 703 calculates the number of identification logs for each of the corresponding device identifiers (item 301) and the registered templates (or authorized users).

Step 704 updates the object identification log to the next identification log. If the next identification log is present in step 705, control is returned to step 702 and the process is continued. Otherwise, control is passed to step 706 and the results counted in step 703 are outputted. The results may be outputted, for example, in the descending order of the frequencies (counted numbers) in a list. This example includes the display screen shown in FIG. 16. By performing the display in such a way, it is possible to identify at least one identifier of the registered template itself, the user, or the device for which it is estimated that a countermeasure is required.

It should be noted that in this embodiment 5, the following processes may be performed in order to effectively perform the identification log collection and the authentication. When performing an authentication process without using PIN information like in this embodiment, if the similarity between the registered template and the input information exceeds a certain level, the authentication is made to be successful. For this, input information may correspond to a plurality of registered templates. For this, even when the registered template firstly compared shows a predetermined similarity with the input information, comparison with the remaining registered templates is required (for acquiring an identification log and searching a registered template having a higher similarity). However, since the first registered template satisfies the authentication condition, there is no problem if a predetermined process such as unlock of a door may be executed.

That is, firstly, the input information is compared to the registered templates one after another. As a result of the comparison, if any registered template corresponds to the input information;

(1) comparison with other (not-yet-compared) registered templates is suspended temporarily and the information on the successful authentication is outputted (or a predetermined process such as unlock of a door is allowed). Then, the completion of the output process of the information on the successful authentication is detected and a comparison is again executed; and (2) comparison between other (not-yet-compared) registered templates and the input information is continued and the information on the successful authentication is outputted (or a predetermined process such as unlock of a door is allowed).

Embodiment 6

Figure 12:
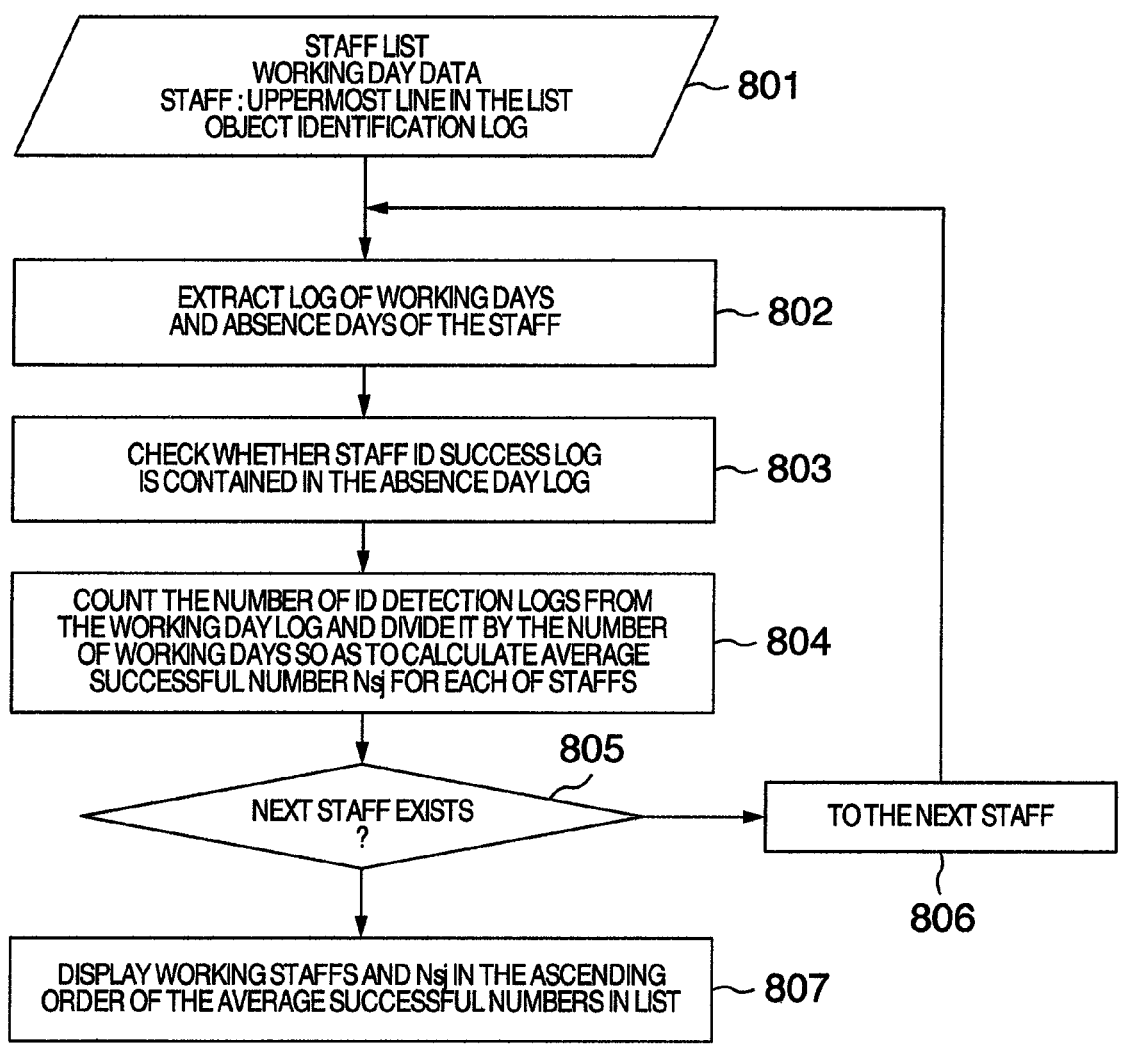
FIG. 12 is a flowchart of a staff-accompanied/unauthorized match analysis process according to embodiment 6 of the present invention.

Lastly, referring to FIG. 12, explanation will be given to a process for detecting a problem that a person can enter together with another user without performing a trial and a problem that a person who has not entered may have entered. The present process compares a presence day and an absence day specified by another method (or judged to be planned) to a presence (entry) state based on the authentication result, so as to check whether no contradiction is present.

In this process, firstly, in step 801, the aforementioned identification device 30 (or the identification management server 20) registers a list of staffs who are to enter a room or building. In the list of staffs, presence days ((a plan including) working days) and (a plan including) absence days such as vacation are registered for each of staff identifiers.

Step 802 identifies a staff and extracts the log distinguishing the working days and the absence days of the staff from an identification log database 51 by extracting the collection date and time of the item 303.

Next, steps 803 and 804 performs a process for confirming whether the identification log has no contradiction. That is, (1) step 803 checks whether the absence day identification log has no successful log of the staff and (2) step 804 counts the number of successful logs from the working day identification log (by using the item 307) and divides the result by the number of working days to obtain an average successful number Nsj. It should be noted that step 804 may judge whether the working days contain the successful log of the staff by using the matched template list of the item 307. This judgment also uses the item 307 but an alarm may be outputted when no successful log is found.

Furthermore, one of the steps 803 (1) and 804 (2) may be omitted. Moreover, the process of step 803 (1) judges whether a registered template of the staff exists in the matched template list of the item 307. Moreover, the order of the steps 803 and 804 may be reversed or they may be performed in parallel (in random order).

Step 805 judges whether next staff is present. If yes, control is passed to step 806 and the processes of 802 and after are executed for the next staff. If no next staff is present, display is performed in the ascending order of the average successful numbers. The display screen may be such as shown in FIG. 17. Moreover, in this embodiment, the display may be omitted or it is possible to output a staff causing a number of contradictions greater than a predetermined value. Furthermore, by using the item 301 instead of item 307, an identification device or a collection device may be used instead of the staff.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method for managing an authentication system including at least one processor and a storage, which authentication system compares input information inputted by a user to a plurality of templates stored in advance in the storage so as to authenticate the user without using personal identifier information, the method comprising the steps of:
storing the plurality of template information in the storage;
inputting the input information via an input device a plurality of times;
under control of a processor, for each of the plural inputs, comparing the input information to the plurality of template information, and summing a number of matches between any of the plurality of template information and the input information for the plural inputs;
acquiring log information indicating a measure of authentication results of the authentication system including the sum of the number of matches, and storing the log information in the storage; and
under control of a processor, comparing the stored log information to accuracy evaluation information indicating the accuracy evaluation of the authentication system predetermined for the authentication system, and outputting an authentication alarm if the log information is deviated from the accuracy evaluation information by a predetermined value or above.

2. The method for managing the authentication system as claimed in claim 1, wherein
the authentication system:
is connected to a plurality of input devices;
stores the number of times when no template information corresponding to the input information is found for each of the input devices as the log information; and
outputs an authentication alarm if the number of times is equal to or above a predetermined value or the number of times is larger than the other input devices by a predetermined condition or above.

3. The method for managing the authentication system as claimed in claim 1, wherein
the authentication system:
includes information indicating quality of the input information as the log information.

4. The method for managing the authentication system as claimed in claim 3, wherein
the authentication system:
correlates the plurality of template information to the identifiers capable of identifying the template information and stores them;
identifies the identifier correlated by the template information when corresponding template information is judged to be present; and
outputs an authentication alarm if any identifier has the number of times when the input information quality which is equal to or below a predetermined threshold value or the number of times is larger than the other identifiers by a predetermined condition or above.

5. The method for managing the authentication system as claimed in claim 1, wherein
the authentication system:
judges that the template information exists if the matching degree indicating a matching degree between the input information and the template information is equal to or above a predetermined value.

6. The method for managing the authentication system as claimed in claim 1, wherein
the authentication system:
outputs information giving a permission to the user if the template information is judged to be present; and
compares the plurality of template information to the input information in a predetermined order so as to judge whether the template information exists and upon detection of the template information corresponding to the input information outputs information giving a permission and continues comparison between the input information and the template information whose comparison is not yet completed, thereby continuing acquisition of the log information.

7. The method for managing the authentication system as claimed in claim 1, wherein
the template information and the input information are biometric information on users.

8. The method for managing an authentication system as claimed in claim 1, wherein the authentication system:
is connected to a plurality of input devices;
stores the plurality of template information in the storage devices while correlating them to identifiers capable of identifying the template information; and
inputs input information within a predetermined time from the moment when it is judged that no corresponding template information exists in the first input device among the plurality of input devices or from the moment when the input information is inputted for the judgment and outputs an authentication alarm indicating a problem of input or a problem of the template information for a user indicated by the identifier corresponding to the template information if judgment that the comparison result with the input information has corresponding template information is executed repeatedly by a predetermined number of times.

9. An authentication system which compares input information inputted by a user to a plurality of templates stored in advance in a storage so as to authenticate the user without using personal identifier information, wherein the authentication system comprises:
identification devices each including a processor and arranged for executing individual authentication by the processor comparing vein information inputted by a user to a plurality of template information on the veins of authenticated users stored in mirrored template databases, and summing a number of matches between any of the plurality of template information and the input vein information for plural vein information inputs;
an identification management server which receives log information including the authentication results from the identification devices via a network;
an identification log database which stores the log information received by the identification management server as an identification log;
a template database which holds the original template information in the storage; and
an operation evaluation terminal including a processor which outputs an authentication alarm and inputs an instruction to the identification management server during the management by the identification management server.

* * * * *